Figure 15:
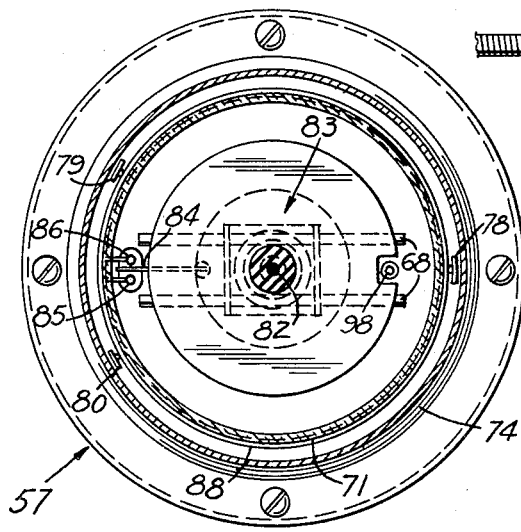

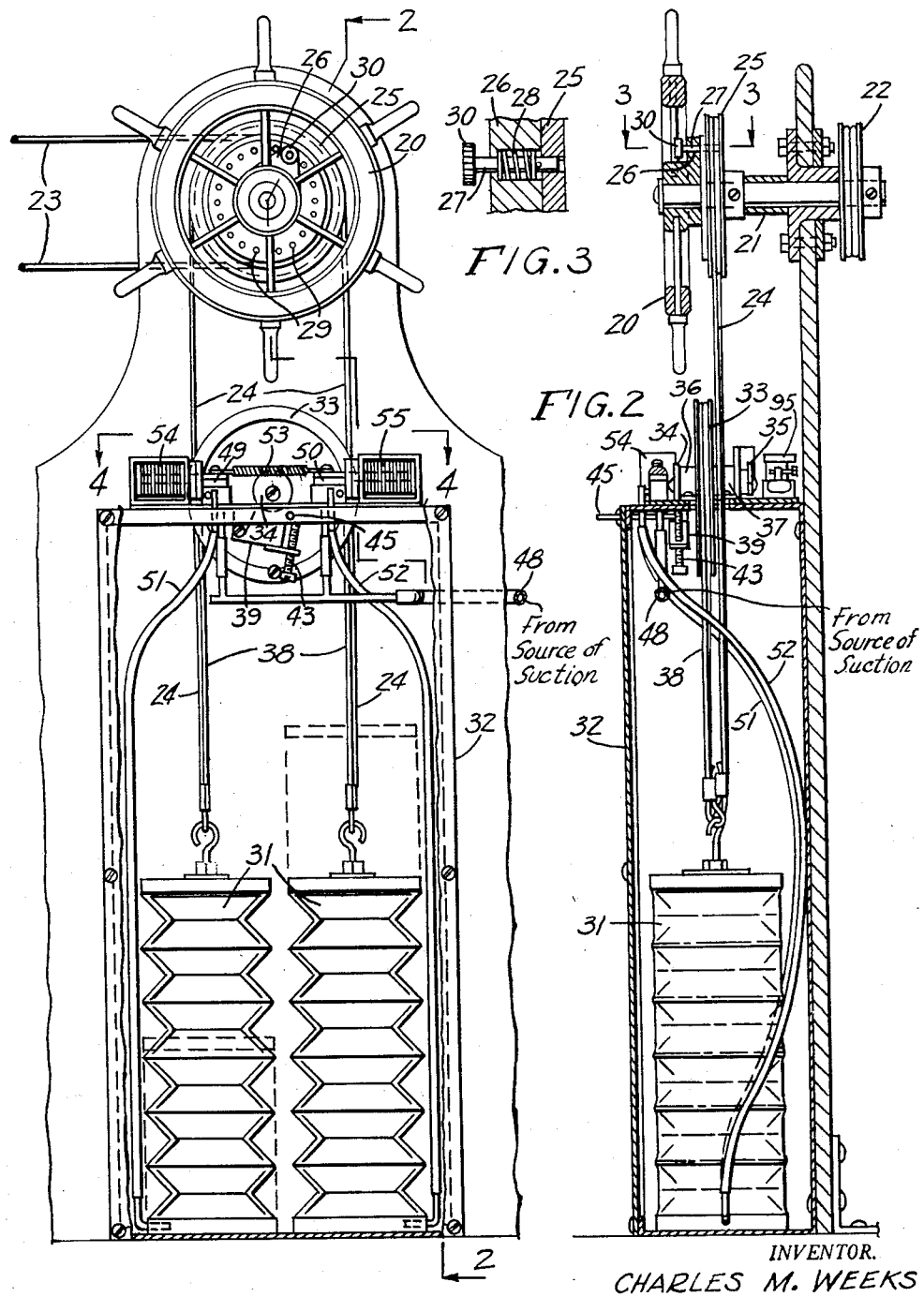

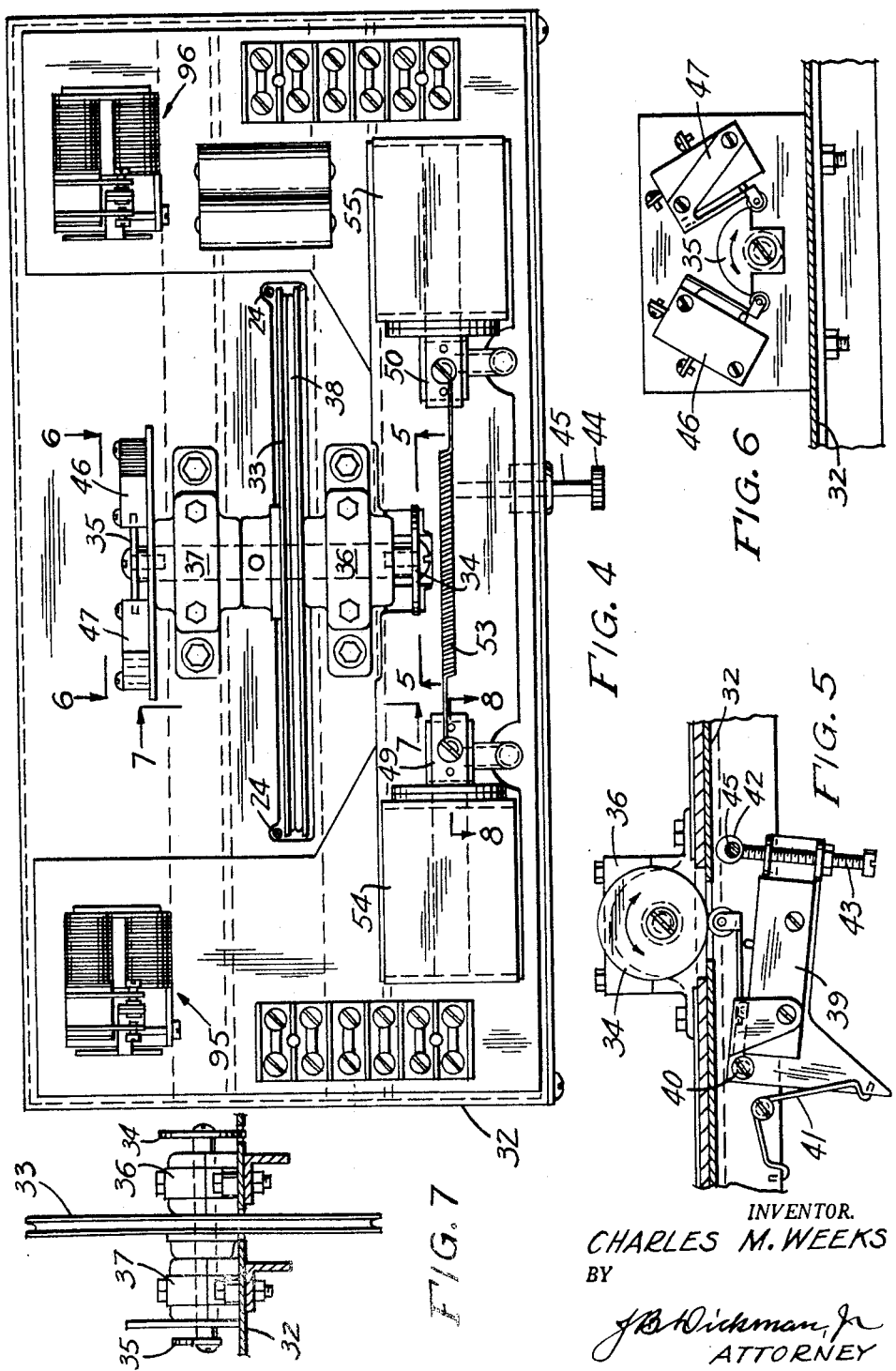

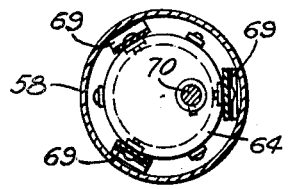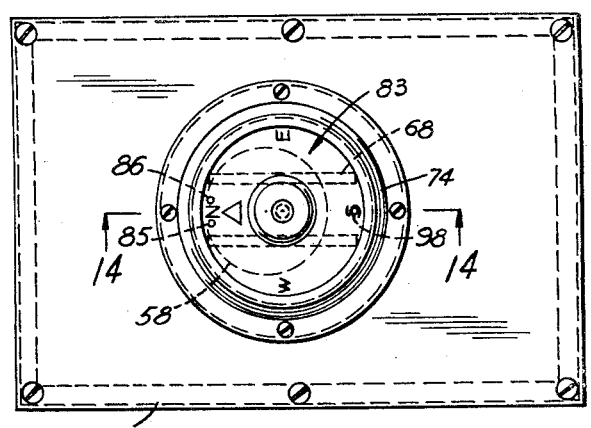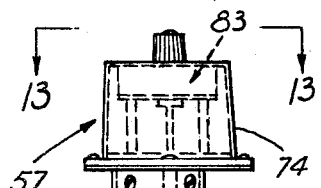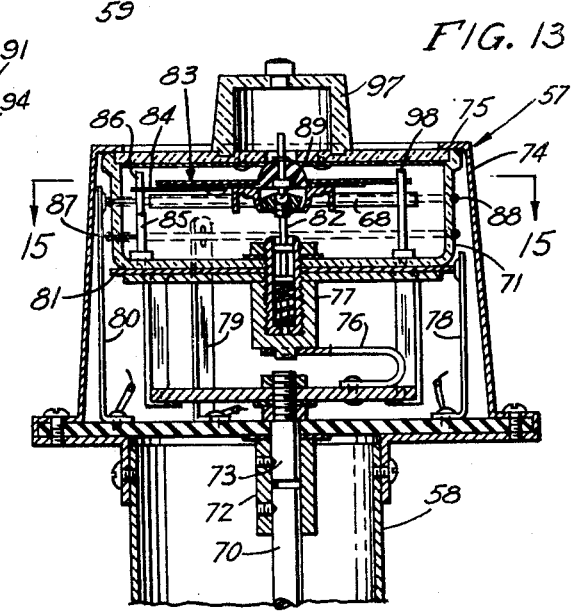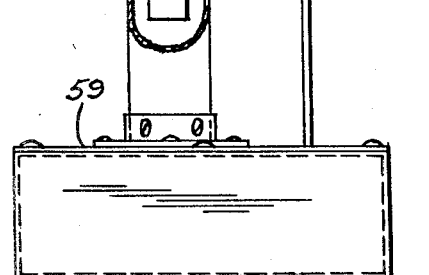
INVENTOR.
CHARLES M. WEEKS

Feb. 16, 1960 C. M. WEEKS 2,925,060
REMOTE CONTROL AUTOMATIC PILOT
Filed Sept. 13, 1955 5 Sheets-Sheet 4

INVENTOR.
CHARLES M. WEEKS
BY
J.B.Dickman, Jr.
ATTORNEY

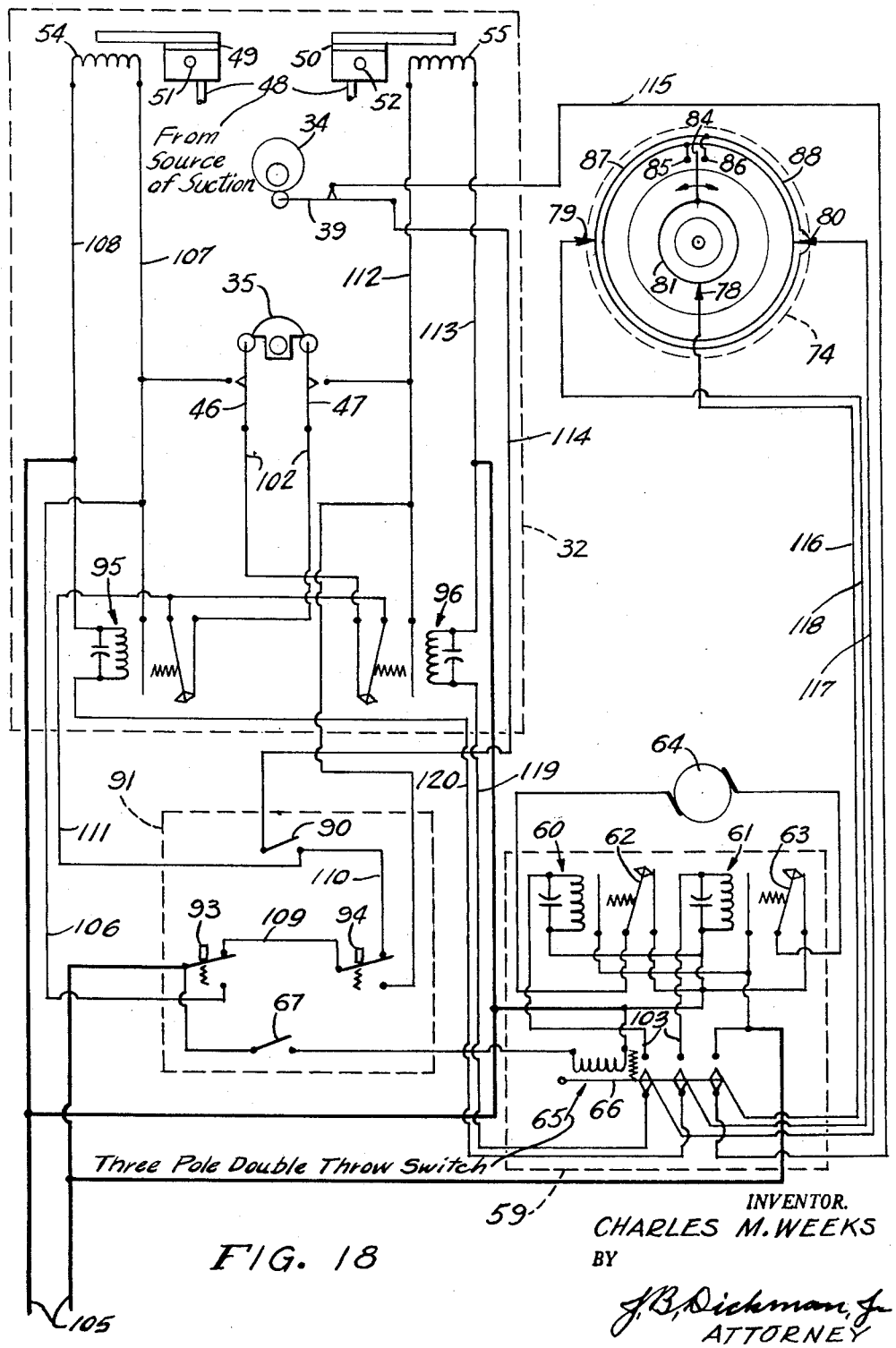

United States Patent Office 2,925,060
Patented Feb. 16, 1960

2,925,060

REMOTE CONTROL AUTOMATIC PILOT

Charles M. Weeks, Takoma Park, Md.

Application September 13, 1955, Serial No. 533,953

14 Claims. (Cl. 114—144)

The present invention relates to attachments for manual steering devices on any powered craft, such as a motor boat or aircraft, to provide power steering with selective remote control and/or automatic pilot control.

Automatic pilots and power steering have in the past been restricted to use on large vessels and some luxury yachts because of the high cost of such equipment. They usually comprise an auxiliary complete steering system in addition to the conventional manual steering system. Small craft owners could not afford such expensive luxuries.

The main object of the present invention is to provide not only a simple and cheap automatic pilot and power steering system adaptable for attachment to any conventional manual steering systems, but also a remote control therefor may be carried to any part of the craft by the operator.

A further object is to make a pneumatic power-steering attachment for the steering controls, with automatic normally rudder centering means, in combination with a simple compass controlled auto-pilot means having manual course setting adjustment, as well as a portable remote control hand switch having a long cable to the control mechanism for selectively controlling the power-steering directly or through the auto-pilot, and for resetting the auto-pilot course setting adjustment to the course being followed at any instant.

A further object is to provide a simple automatic steering system adaptable for attachment to any conventional steering apparatus and having power steering with remote control means which may be easily carried around and operated by one hand from any part of the craft, limited only by the length of cable provided on the remote control means.

A further object is to include in the above system a compass controlled auto-pilot means with manual course setting means on said compass also operable for adjustment under control of said remote control means.

A further object is to provide the above remote control means with switches for selectively operating the power steering directly and/or through said auto-pilot means, as well as for resetting the course for the auto-pilot to follow.

A further object is to provide in the above system means for manually resetting the auto-pilot course.

A further object is to provide an adjustable connection between the normally centered position of the steering control of the above system with the manual steering controls so that the rudder may be held off its centered position an amount sufficient to hold the craft on a straight course under any particular adverse conditions, when the steering control of the system is centered.

A further object is to provide the automatic steering in pulses, moving the rudder thru a predetermined arc and alternately centering the steering control, repeating the pulses until the craft is turned to move on its set course.

A further object is to provide means for reducing the above mentioned arc as may be desired, in accordance with the dictates of the navigating conditions, so that the final pulse does not cause over steering and hunting.

Figure 8:
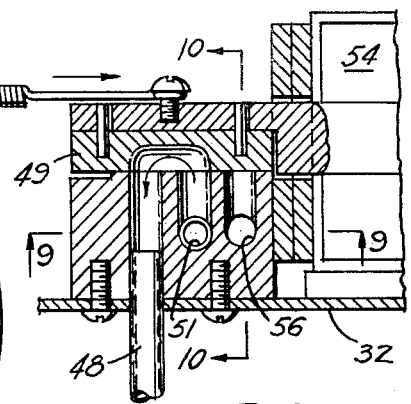
Figure 9:
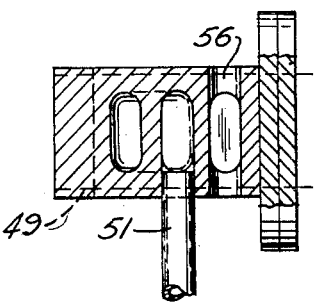
Figures 16, 17:
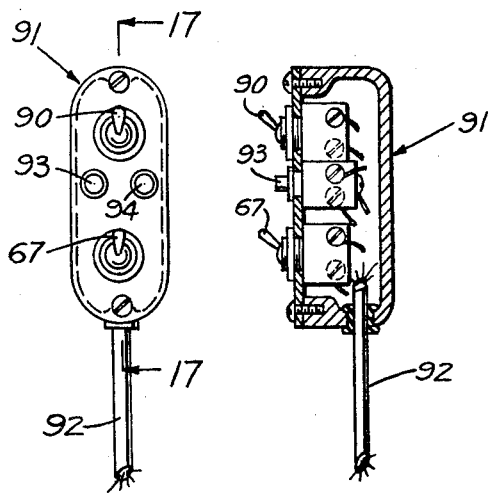
Figure 10:
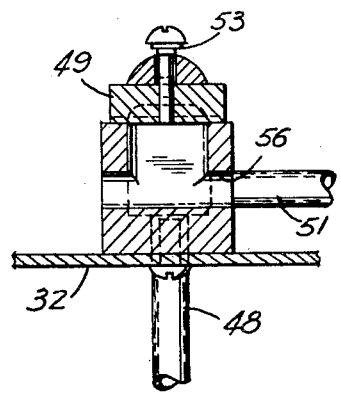

Other and more specific objects will appear in the following detailed description of one preferred form of the invention, as illustrated in the accompanying drawings, wherein:

Fig. 1 is a front elevational view of the power steering and control means attached to a conventional boat steering means, with the front cover of the boxed portion cut away to show the pneumatically operated bellows, Fig. 2 is a vertical sectional view thereof, taken on the line 2—2 of Fig. 1, Fig. 3 is an enlarged detail sectional view taken on the line 3—3 of Fig. 2, Fig. 4 is a sectional plan view on an enlarged scale, taken on the line 4—4 of Fig. 1, Figs. 5, 6, 7 and 8 are enlarged detail views taken on the correspondingly numbered lines in Fig. 4, Figs. 9 and 10 are sections taken on the lines 9—9 and 10—10 respectively of Fig. 8, Fig. 11 is an elevational view of the auto-pilot compass pedestal and instrument base, the pedestal being partly in section to show the motor drive for the automatic adjustment of the auto-pilot course setting, Fig. 12 is an enlarged sectional view through the pedestal taken on the line 12—12 of Fig. 11, Fig. 13 is enlarged plan view of the auto-pilot compass and base, Fig. 14, is a further enlarged sectional view of the compass taken on the line 14—14 of Fig. 13, Fig. 15 is a sectional plan view taken on the line 15—15 of Fig. 14, Fig. 16 is a top view of the portable hand switch assembly, Fig. 17 is a section thereof taken on the line 17—17 of Fig. 16, and Fig. 18 is a schematic wiring diagram of the electrically operated system.

Illustrated in Figs. 1 and 2 is a conventional steering control wheel 20, fixed on shaft 21, which has a rudder control pulley 22 at its rear end adapted for operating the rudder through rein lines 23.

The apparatus of the present device is connected to the steering control shaft 21 by means of the line 24 passed over and fixed at a remote point to a steering control pulley 25, which is freely rotatably mounted on steering control shaft 21 but is held axially against a plate 26, which serves as a crank fixed to the wheel 20. Plate 26 has a crank pin 27 held biased by a spring 28 in a selected one of a series of bores 29 drilled through the pulley 25 in a circle about its center. Crank pin 27 has a knob 30 on its outer end, so that it may be pulled out of the pulley for angular readjustment of steering wheel 20 and shaft 21 and rudder control pulley 22 with respect to the power steering control pulley 25, for a purpose to be hereinafter more fully disclosed, by allowing the pin 27 to fall into a selected one of the bores 29 in the pulley 25.

The lower ends of line 24 are attached to the upper ends of a pair of pneumatically operated bellows 31, shown in full lines in Fig. 1 in their centered or straight steering positions and in dotted lines in positions corresponding to a left rudder position. These bellows may be housed in a box-like enclosure 32, the top of which may serve as a support for some of the control mechanism.

A pulley 33, having a limit switch cam 34 and a centering cam 35 on its shaft is rotatably mounted in bearings 36 and 37 supported on the top of enclosure 32. Cam control pulley 33 is operated by a line 38 passed over and fastened to it against slipping and having its ends connected to the upper ends of the bellows 31 like line 24. The angular movement of cam control pulley 33 will thus correspond to the angular movements of the steering and rudder control pulleys 25 and 22 respectively.

A limit switch 39, pivotally mounted at 40, is resiliently held by spring 41 against stop cam 42 for operation by cam 34. Cam 34 is an eccentric circular cam having its smallest radial dimension toward the switch, in its centered position. Switch 39 is provided with an adjustable set screw 43 having its end resting against stop cam 42. Set screw 43 may thus be adjusted to cause the cam 34 to actuate the switch upon the slightest turning in either direction when the stop cam 42 is set at its lowest stop point, so that turning adjustment of the stop cam will determine the extent of turning of cam 34 in either direction that will be required to actuate the limit switch. As already mentioned, the automatic steering is performed in pulses by operation of a steering pulse circuit branch through conductor 101, which includes a contact wire 84 on a compass needle floatingly mounted between a pair of closely spaced contacts 85 and 86 in the compass bowl, to actuate opposite rudder control solenoid valves 49 and 50, to be hereinafter more fully described, for turning the rudder to bring the craft on course with a predetermined amount of rudder angle, by intermittently breaking the turning circuit branch and making the centering circuit branch to keep the rudder at a substantially predetermined angle during the turning operation in the required direction. The limit switch 39, being held in the steering pulse circuit branch during automatic steering by closure of control switch 90, and designed to break this pulse upon actuation, will therefore determine the amount of rudder angle reached in each pulse, in accordance with the adjustment of the stop cam 42 by means of the control knob 44 on the shaft 45 of the cam. The maximum obtainable pulse, which provides full right or left rudder, corresponds to a turn of the control pulley and cams of substantially 90° from centered position.

The centering cam 35 has a raised portion for actuating either one of two centering switches 46 and 47 whenever it is turned off center position in a corresponding direction, for returning the rudder control pulley to neutral and the cam 35 to center position after the limit switch is actuated to stop a steering pulse, until the limit switch 39 is again closed.

The power for steering may be obtained from any source of fluid under subatmospheric pressure, which may be a suction pump specifically designed to provide the required capacity, or the suction may be obtained from the intake manifold of an engine used for propelling the craft. Whatever the source of suction, it is connected to the conduit 48 which has a branch leading to each of two control valves 49 and 50 which normally maintain a connection between these branches and conduits 51 and 52 respectively, leading to the bottoms of the respective bellows 31, as shown. Valves 49 and 50 are resiliently held in their normal positions by a common spring 53 stretched between them, and are moved outwardly by solenoids 54 and 55 to connect the conduits 51 or 52 with the atmosphere while closing off the connection to conduit 48, so as to permit atsmospheric pressure into the corresponding bellows through ports 56, which are open to the atmosphere. Thus the bellows are operated to apply left rudder when valve 50 is operated by actuation of solenoid 55, and right rudder whenever valve 49 is operated by actuation of solenoid 54. Either steering pulse is continued for a predetermined arc of rudder turning, in accordance with the adjustment of the stop cam 42 if the limit switch is in operation, or as long as the solenoid is actuated, up to maximum rudder turning. As soon as the solenoid 54 or 55 is deenergized, the proper centering switch 46 or 47 which is in closed position for actuation of the opposite valve solenoid to bring the bellows and steering mechanism to their center position is brought into the solenoid operating circuit by the corresponding relay 95 or 96. This operation will become clear by a study of the operating circuits shown in Fig. 18, which will be hereinafter fully described.

The auto-pilot is controlled by a compass 57 mounted on a hollow pedestal 58, the base of which provides a housing 59 for a pair of solenoid operated relays 60 and 61 having single pole double throw switches 62 and 63 for controlling the auto-pilot course setting motor 64 and a third solenoid operated relay 65 having a three pole double throw switch 66 for normally connecting the auto-pilot circuit branches to the steering control circuit branches to keep the craft on course, and operated by toggle switch 67 to switch this connection to the relay circuit controlling motor 64 to move the course setting of the auto-pilot to the established course or any course into which the craft is steered so that when toggle switch 67 is turned off to return switch 66 to its normal position, the auto-pilot will continue holding the craft on said course.

The construction material for the pedestal and parts of the compass except for the magnet bars 68 is all non-magnetic so that the compass bars and their tendency to seek a true earth's magnetic position will not be affected by detrimental anomolous magnetic fields. The motor 64 is suspended as far away as possible from the compass within the high pedestal, by a long operating shaft 70 of non-magnetic material so that the magnetic effect of the motor windings on the earth's magnetic field at the compass will be negligible. The motor 64 has three friction springs 69 mounted around its periphery and engaging the inner wall of the pedestal, to frictionally hold the motor against turning when it is operated to turn the shaft 70 in either direction to reset the auto-pilot course.

The compass bowl 71 has a transparent top with a compass rose or scale of directions around its periphery and a turning knob in the center for manual adjustment of the auto-pilot course setting. The bowl 71 is rotatably mounted to turn with the shaft 70 to which it is fixed by collar 72 and stub shaft 73 passing through a bore in the top of the pedestal 58. The housing 74 has a circular flange 75 against which the bowl 71 is biased by the leaf spring 76 fixed between the stub shaft 73 and the well portion 77 in the bottom of the bowl 71.

Three spring contact arms 78, 79 and 80 are insulatably mounted within the housing 74. Contact arm 78 is biased against the edge of circular conductor plate 81 mounted in the base of the bowl 71 and having electrical connection through the center post 82 and compass needle assembly 83, with the flexible conductor wire 84, inserted between conductor pins 85 and 86, which are in electrical communication with conductor slip rings 87 and 88 against which the contact arms 79 and 80 are biased respectively. The compass needle assembly is provided with a central needle point mounted in a metal jewel bearing 89 in the top of post 82, the needle assembly being balanced on this needle point so that it will respond freely to the earth's magnetic field and will continually seek to turn the wire 84 into the north direction, and thus bias it against one of the other of the conductor pins 85 and 86 until they are turned with the bowl 71 and the entire craft until the pins are in a northerly direction to each side of the magnetic north, when the wire 84 will float freely between them.

When the auto-pilot control switch 90 is turned on, the contact of the wire 84 with either of the pins 85 or 86 will complete the proper steering circuit branch by energization of the solenoid of relay 95 or 96 for causing repeated steering pulses in the corresponding direction, interrupted by the breaking of this circuit branch by operation of the limit switch cam, and completion of the opposite steering circuit branch by operation of the corresponding centering cam switch, until the craft is brought on course and the wire 84 floats freely between the pins 85 and 86. Operation of either of the push button steering switches 93 or 94 in the meantime, will break the auto-pilot control circuits and place the corresponding solenoid 54 or 55 directly across the power supply lines 105 to turn the rudder any amount and the craft may be temporarily guided to take any other course as may be desired. However, as soon as the push buttons are released, the auto-pilot circuits will take over and bring the craft back on the course set by the position of the compass bowl. The bearing of the course may be indicated on the compass rose at a reference point on the flange 75 of the housing 74 marked radially forward of the housing, parallel to the longitudinal axis of the craft.

With the control switch 90 turned on, if the course resetting switch 67 is also turned on, the relay 65 is operated and the craft may be steered into any new course by using the push button switches 93 and 94 and the course setting circuit branches completed through conductor 116 and now operated by the auto-pilot circuit branches completed through conductors 117 and 118 and including the motor control relays 60 and 61, will turn the compass bowl 71 to the new course setting corresponding to the course to which the craft is turned. Opening the switch 67 will then cause the auto-pilot circuit branches to take over the steering and keep the craft on the new course.

The control switch assembly 91 may be made very light and is easily operable by the fingers of one hand, and carried anywhere on board if provided with a sufficiently long cord 92. This cord 92 carries all the wire connections between the hand switch assembly 91 and the box 59. The terminals at the box 59 may be connected through a Jones plug to facilitate assembly of the equipment.

Similarly Jones plug connections may be used to provide a single cable connection for the necessary wire connections between the parts in the box 59 and those on the power steering assembly on the top of enclosure 32.

It will be noted that the centering circuit relays 95 and 96 have single pole double throw switches which are normally spring pressed to complete the centering circuit branches 102 through either centering switch 46 or 47 when the centering circuits are completed by both push button switches 93 and 94 being released, as shown in Figure 18. But when the auto-pilot control switch 90 is on, the corresponding relay 95 or 96 causes its switch to break the corresponding centering circuit through conductor 102 while the steering pulse circuit is on and actuating the relay. When the pulse is stopped by breaking of the circuit at the limit switch 39, the relay 95 or 96 releases its switch to normal position to complete the centering circuit.

In order to more fully describe the operation of the electrical circuits as shown in Fig. 18, a manual remote power steering operation will now be described by tracing the circuits operated in response to depressing one of the push buttons for steering in one direction, e.g. the push button 93 for steering to the right. When this button is depressed to close the switch on the lower contact as shown in Fig. 18, current flows from one of the power lines 105 through conductors 106 and 107 to solenoid 54 and returns through conductor 108 back to the other power line 105. Valve 40 vents the left bellows 31 to atmosphere through 56 while closing off its supply of suction through 48, causing the suction in the right bellows to provide power steering to the right. Simultaneously the cams 34 and 35 are turned clockwise, but with no effect because none of the switches 39, 46 and 47 are in any operative circuit as long as push button 93 is depressed. The right steering operation continues up to its maximum turned position unless push button is released, when the valve 49 returns to its normal position and the rudder begins to return to neutral steering position until the push button is fully released to close its upper contact. At this instant current is supplied through conductors 109, 110, 111, the switch of relay 95, switch 47 (if still closed), conductor 112, solenoid 55, and conductor 113, back to the other power line 105. Valve 50 thus vents the right bellows to aid in the return of the power steering means to neutral rudder position until the switch 47 opens when centering cam 35 reaches center position.

Operation of button 94 produces opposite rudder effects in the same way through operation of similar circuits as may readily be traced in the diagram of Fig. 18.

For an automatic steering on a set course, toggle switch 90 is operated to closed position which directs the current flow through conductor 114, switch 39, conductor 115, switch 66 and conductor 116 to the floating wire 84 in the compass for delivery upon contact with either contact 85 or 86 of the course setting means to the corresponding ring 87 or 88, sliding contact 80 or 79, conduit 117 or 118, switch 66, relay solenoids of relays, conduits 119 or 120, respectively, and back to the other power line. The relay 96 or 95 would thus operate to complete the corresponding valve solenoid circuits to operate either valve 50 or 49 to provide left or right steering until the compass wire 84 broke contact with the set contacts 85 or 86 as the case may be, when the craft was brought on the set course.

In connection with the centering circuits, there are times when it is desirable to change the relation between the center position of the power steering mechanism and the rudder control pulley, when a definite amount of left or right rudder is necessary to maintain the craft on a straight course under adverse wind conditions. Under such conditions, when it is found that the auto-pilot is continuously called upon, during its operation in maintaining the craft on a set course, to send steering pulses to the rudder in the same direction, the pin 27 in the crank plate may be pulled out temporarily while the steering wheel is manually manipulated to maintain the straight course desired by giving the rudder the required deflection, which may be called its neutral position under the prevailing wind conditions for the particular course; then the pin 27 may be released and allowed to fall into the nearest perforation in the pulley 25 and the steering job is then made easier for the auto-pilot. In other words, the angularly adjustable quick-coupling means 29—30 between the steering control wheel 20 and the power steering control pulley 25 provides for quick and easy correlation between the center steering position of the pulley and the straight steering position of the wheel under the prevailing atmospheric and water currents, so as to reduce hunting under the automatic set course control.

At any time, when it may be desired to steer the craft manually without turning off the power in the power steering mechanism, all that is necessary is to disconnect the steering wheel from the attachment by pulling out pin 27 as above and, if convenient, turning off both control switches 90 and 67 on the portable switch assembly 91, so as to keep the power steering mechanism centered while not in use. Of course, the power for the power steering means may also be turned off if desired, because it is available instantly whenever required. Before returning the steering wheel control to the power steering attachment, the craft is brought on a straight course manually, the pin 27 is then released to make the connection with the proper perforation of the pulley 25.

In automatic operation, when the auto-pilot is switched on by control switch 90, the compass bowl 71 may be turned manually by means of knob 97 to any course setting for the auto-pilot to follow.

To prevent damage to the contact wire 84 by accidental over flexing, a stop pin 98 is mounted in the compass bowl 71 in the plate notch between the magnet bars 68 on the compass needle assembly so as to limit the range of relative turning permitted between the compass needle assembly and the pins 85 and 86 fixed to the compass bowl.

In accordance with the above description, it may readily be seen by those experienced in the art, that this power steering attachment has many desirable features, among which some of the more important ones are simplicity, adaptability, stability of response and adjustability to conditions.

The pneumatic bellows type of power units are the simplest, and are not subject to leakage or any appreciable friction losses. They are readily adaptable for attachment to rein lines or pulleys of any type which may readily be adapted for connection to any existing manual steering devices on air or sea craft, having a steer-control shaft.

This power steering attachment is normally held in a centered or neutral control position by means of the centering cam 35 which actuates either switch 46 or 47, when the control is off neutral in the corresponding direction, to bring it back to neutral. Normally both of the oppositely centering circuit branches 102 are otherwise completed through the relay switches 95 and 96, and the push button switches 93 and 94 when in released positions.

Operation of either of these push button switches 93 or 94, breaks these centering circuits temporarily while completing the circuit through solenoid 54 or 55 to move the steering control to cause a turn to the right or to the left respectively, up to its maximum turn position if the button is held depressed long enough. The steering control may be stopped and held in any intermediate turn position by releasing the push button only partly, to de-energize the respective solenoid without completing the normal centering circuit. Should both push buttons be accidentally depressed at the same time, no harm would be done because the energization of both solenoids 54 and 55 would cause cutting off the course of suction from both bellows 31 and simply inactivating the power steering entirely for the time being.

For automatic steering, as already explained, the toggle switch 90 is turned on. This simply brings the compass needle contact branches in parallel connection with the centering control circuits through conductors 102 and the three pole switch 66 in its normal position as shown in Figure 18 and the pulse limit switch 39, whereupon the compass needle takes over the primary control of the steering operation by sending pulses selectively to either of the solenoids 54 or 55 to bring the craft on course in accordance with the setting of the compass bowl 74 with its closely spaced contact pins 85 and 86. If the craft is not on course, the compass needle wire 84 will touch one of these contact pins, thus steering the craft in the same direction until the wire 84 swings away from the contact pin into the small clearance between the two contact pins.

The pulse limit switch breaks this contact branch each time the steering turn reaches a predetermined amount, as determined by the adjustment of the switch 39 by cam 42 through the control knob 44, and the correspondingly opposite centering circuit having a conductor 102 is completed by deactivation of the corresponding relay 95 or 96, to return the steering control towards center just a small amount until the switch 39 is again closed and the pulse is reversed, repeating the alternate operation of the steering and centering circuits to maintain the angle of turn of the steering control at a substantially controlled constant amount. The desired amount of turn angle will depend on the speed of the craft, wind conditions, etc., and is controlled by means of the knob 44.

During automatic operation, it is obvious that the steering control may be operated by cutting in with the push buttons to temporarily take over the turning operation of the steering control in either direction, the steering control being returned to the automatic operation immediately upon release of the push buttons.

When the toggle switch 67 is turned on, the three pole switch 65 is operated to disconnect the compass needle contact branches from the steering control circuits and to connect them into the compass bowl turning motor controls for reversely turning the bowl in a selected direction in accordance with whichever of the contact pins 85 or 86 happens to be contacted by the wire 84 at the time. The bowl is turned automatically as a result in the same direction, until wire 84 breaks away from the contact pin to float freely in the small clearance between the contacts. Thus the course setting of the bowl may be remotely controlled to set it for any course which the craft may be following at the time. Operation of the switch 67, of course, has no effect on the push button controls, and they may be used to change the course while switch 67 is on, and the adjustment of the bowl setting will automatically follow any change in the course, so that after switch 67 is turned off, subsequent automatic steering will follow the course set at the time the switch 67 was turned off. The bowl may be reset for any compass course desired, manually, when switch 67 is off, by means of the knob 97.

Various modifications in the design of the control circuits may suggest themselves to those familiar with the art, such as, e.g., the use of reduced current for the circuit which is operated by the fine wire contact, such as wire 84, in order to prevent damage by burning, etc. It might be desirable to use step-down transistors to provide such reduction in current or other simple means to provide this protection. However, basic control connections essential to the operation of the present invention would be retained as herein disclosed.

Many other obvious modifications in the details of the parts and in their general arrangement may be made without departing from the spirit and scope of the present invention, as defined in the appended claims.

What is claimed is:

1. In a craft having a manually rotatable steering control shaft, the combination comprising a rotatable power operated steering control means having an angularly adjustable coupling for attachment to said shaft and having a center position, power means connected to said power operated means for selectively turning it to provide left or right steering operation of the craft through said coupling, and automatically operated control means for said power means to normally return said power operated means into said center position, said angularly adjustable coupling comprising a crankplate portion of said power operated means rotatably mounted on said shaft and having a series of annularly spaced crankpin receiving perforations about said shaft, a crank fixed to said shaft adjacent said crankplate portion, and a crankpin slidably mounted in said crank and biased to extend into one of said perforations, said crankpin having a knob accessible to the helmsman for pulling said crankpin out of one perforation and releasing it into another after turning the steering control shaft into a desired angular course maintaining position to correlate it to the center position of said power operated means for automatically holding the craft on a desired course without hunting.

2. A power steering attachment as defined in claim 1, said power means comprising a pair of opposed pneumatically operated bellows operatively connected by a line passed over a pulley comprising said rotatable power operated steering control means, a solenoid operated control valve for each bellows for normally connecting it to a common source of suction, a solenoid and a solenoid energizing circuit for operating each valve to vent said bellows to atmosphere in response to energization of its solenoid to cause power operation of said pulley in the corresponding direction from center position, said automatically operated means comprising a centering cam operatively connected to said pulley for turning therewith, a pair of normally open switches connected to said circuits and selectively operable by said centering cam in accordance with the direction of its displacement from center, to complete the solenoid energizing circuit through the corresponding valve solenoid for returning said pulley to center position, and power supply lines for said solenoid energizing circuits.

3. A power steering attachment as defined in claim 2, and a symmetrical limiting cam operatively connected to turn with said pulley, an auto-pilot circuit and control means therefor, a normally closed limiting switch in series with a control switch connecting the solenoid energizing circuits to said power lines through said auto-pilot control means, said limiting switch being actuated to open when said pulley is turned a predetermined angle in either direction from center depending on the spacing between the cam and the cam follower of the switch when the pulley is in center position and the follower is at the lowest point of the limiting cam, whereby the extent of steering from center or neutral steering position is determined by said spacing to produce a pulsating steering control as the limiting switch is actuated to on and off position to connect and disconnect the auto-pilot control means.

4. A power steering attachment as defined in claim 3, and means for adjusting said spacing to adjust the extent of steering as may be desired.

5. A power steering attachment as defined in claim 4, said auto-pilot control means including a compass pedestal, a compass thereon having a manually adjustable course setting ring with a pair of switch contacts closely spaced for cooperation with a floating third contact fixed to the compass needle positioned between said pair to provide the auto-pilot control to the solenoid circuits in accordance with the setting of said course setting ring.

6. A power steering attachment as defined in claim 5, a motor in the bottom of said pedestal operatively connected by non-magnetic means to said course-setting ring, and automatic control switches for said motor to turn said course-setting ring in response to contact of the floating contact and one of said spaced contacts in the corresponding direction, whereby the course-setting ring may be automatically reset to any particular course being followed at the time and the auto-pilot then turned on to continue holding said course.

7. A power steering attachment as defined in claim 6, a control switch for connecting said power supply lines through said motor control switches, and a relay in said connection for disconnecting the power supply to said auto-pilot circuit and passing it through said compass controlled switches.

8. A power steering attachment as defined in claim 2, a compass having a wire fixed to the needle which is floatingly mounted in the compass bowl, said compass bowl being rotatably adjustable in the horizontal plane and having contact pins closely spaced on each side of said wire near its outer end, for completion of steering control circuits through the wire and the pins selectively to provide automatic steering in accordance with the setting of said bowl, a three pole double throw relay switch, said wire having its terminal connected with one pole of said three pole switch, said contact pins having their terminals connected to the other two poles of said three pole switch, said switch in its normal position contacting its three poles with contacts having connections leading to one side of the power supply lines and to each of said two solenoid operated valves respectively, an eccentric cam operatively connected to said steering shaft, a normally closed switch pivotally mounted for adjustment radially with respect to said eccentric cam for actuation thereby upon turning of said eccentric cam a predetermined amount from its normal central position, adjusting means for said pivoted switch, a pair of push button switches connected to said solenoid energizing circuits for manual control of said power steering means, a pair of single pole double throw relay switches normally biased to contacts for completing the solenoid energizing circuits through the opposite centering switches in response to manual control of said power means, the poles having terminals connected to one of a pair of power supply lines for the centering circuits through the push button switches in their released positions, said terminal connection leading to one of the power supply lines including said pivotally mounted switch and an automatic steering control switch in series tapped into said power supply line between said centering switches and said push button switches, said other contacts of said double throw relay switches being connected to one terminal of their respective solenoid operated valves, their relays having in the connections from said three pole switch to the other terminals of their respective solenoid operated valves, for operating the relay switches to actuate the proper solenoid valve while opening the correspondingly opposite centering switch temporarily while the pivoted switch is closed to provide a pulsing steering control during automatic steering at a substantially controlled steering amount until the craft is brought on course.

9. A power steering attachment as defined in claim 8, and a course setting control switch for actuating said three pole relay to throw the three switch poles into contact with terminals of one of the power lines and of the two double throw relay switches respectively for controlling the operation of a reversing motor to turn said compass bowl until said compass needle wire floats freely between said contact pins.

10. A power steering attachment as defined in claim 9, a portable switch box for said push button switches, said automatic steering switch and said course setting switch, and a cable for the connections between said switches in the control box and rest of the electrical system for remote control from distant stations on said craft.

11. A power steering attachment for air or sea craft equipped with a manual steering control wheel fixed to a steering control shaft, comprising pneumatically operated power steering means having a pulley adaptable for rotatable mounting on said shaft and a pair of bellows connected to opposite ends of a line passed over said pulley, said bellows being normally connected to a common source of suction, said power steering means including means for normally holding said pulley in a center steering position, and angularly adjustable quick-coupling means between said wheel and said pulley to correlate the center steering position of the pulley with the position of the wheel required to maintain a straight course under prevailing wind conditions requiring different positions of said wheel to maintain the craft on any selected course.

12. A power steering attachment as defined in claim 11, said power steering means including means for automatically operating said pulley selectively to the right or left in a succession of limited pulses interrupted by slight return movements toward straight steering position until a desired course is reached and then to return said pulley to center position.

13. A power steering attachment as defined in claim 12, said means for normally centering and automatically operating said pulley further including a pair of pneumatic bellows interconnected by a line passed over and connected to turn said pulley, a solenoid operated control valve for each bellows normally biased to adapt the bellows for connection to a source of subatmospheric pressure, a control circuit having parallel branches for operating said control valves selectively to open the corresponding bellows to atmosphere and shut off the connection to the source of subatmospheric pressure so as to provide power steering in the corresponding direction, a centering cam operatively connected to said pulley for turning therewith and having a corresponding center position, and a pair of normally open switches operated selectively by said centering cam upon turning off from its center position in either direction, said switches being in said parallel branches to energize the selected solenoid to return the power steering means to pulley center position, an autopilot system including a compass having a course setting control and a circuit connected to said solenoid branches for power steering controlled by the compass in response to said course setting control, a motor having control means for automatically setting the course setting control on the course being followed at any time, and remote control switch means connected to energize either valve branch selectively for manual operation of said power steering control means and having additional switches for turning on the auto-pilot circuit and for automatically setting the course setting control.

14. A power steering attachment as defined in claim 13, and a cable for connection to said remote control switch means of sufficient length to reach any part of the deck of said craft, said remote control switch means comprising a small casing for holding in the hand, and having a pair of push buttons for manual operation of the power steering switch means, and toggles for said additional switches.

References Cited in the file of this patent

UNITED STATES PATENTS

| | | |
|---|---|---|
| 905,871 | Hall | Dec. 8, 1908 |
| 1,589,673 | Winter | June 22, 1926 |
| 1,621,835 | Davis | Mar. 22, 1927 |
| 2,340,175 | Chance | Jan. 25, 1944 |
| 2,347,837 | Morrison | May 2, 1944 |
| 2,432,667 | Kettering | Dec. 16, 1947 |
| 2,448,778 | Crise | Sept. 7, 1948 |
| 2,498,223 | Rommel | Feb. 21, 1950 |
| 2,541,217 | Dias | Feb. 13, 1951 |
| 2,641,213 | Bolin | June 9, 1953 |